(12) United States Patent
Zheng et al.

(10) Patent No.: US 9,384,863 B2
(45) Date of Patent: Jul. 5, 2016

(54) APPARATUS FOR RETENTION OF MOLTEN MATERIAL OUTSIDE GENERATION IV REACTOR AFTER NUCLEAR POWER PLANT ACCIDENT

(75) Inventors: Mingguang Zheng, Shanghai (CN); Cheng Ye, Shanghai (CN); Guoxing Gu, Shanghai (CN); Jinquan Yan, Shanghai (CN); Yuanwei Ye, Shanghai (CN); Guobao Shi, Shanghai (CN); Song Chen, Shanghai (CN); Kemei Cao, Shanghai (CN)

(73) Assignee: Shanghai Nuclear Engineering Research & Design Institute, Shanghai (CN)

( * ) Notice: Subject to any disclaimer, the term of this patent is extended or adjusted under 35 U.S.C. 154(b) by 243 days.

(21) Appl. No.: 14/130,402

(22) PCT Filed: Jun. 20, 2012

(86) PCT No.: PCT/CN2012/077185
§ 371 (c)(1),
(2), (4) Date: May 5, 2014

(87) PCT Pub. No.: WO2013/159439
PCT Pub. Date: Oct. 31, 2013

(65) Prior Publication Data
US 2014/0241483 A1    Aug. 28, 2014

(30) Foreign Application Priority Data

Apr. 27, 2012 (CN) .......................... 2012 1 0127012

(51) Int. Cl.
*G21C 9/00* (2006.01)
*G21C 9/016* (2006.01)
*G21C 13/02* (2006.01)

(52) U.S. Cl.
CPC ................ *G21C 9/016* (2013.01); *G21C 13/02* (2013.01); *Y02E 30/40* (2013.01)

(58) Field of Classification Search
CPC .......... G21C 9/00; G21C 9/016; G21C 13/02; G21Y 2002/207; G21Y 2002/303; G21Y 2002/50; G21Y 2002/501; Y02E 30/40
See application file for complete search history.

(56) References Cited

FOREIGN PATENT DOCUMENTS

| CN | 1029176 | 7/1992 |
|---|---|---|
| CN | 102306507 | 1/2012 |
| JP | 2010271261 | 12/2010 |
| KR | 20110115725 | 10/2011 |

OTHER PUBLICATIONS

"International Application No. PCT/CN2012/077185, International Search Report dated Feb. 7, 2013", 8 pgs.

*Primary Examiner* — Marshall O'Connor
(74) *Attorney, Agent, or Firm* — Schwegman Lundberg & Woessner, P.A.

(57) ABSTRACT

An apparatus for retention of molten material for a Generation IV reactor after a nuclear power plant accident comprises an inner wall which is peripherally closed, a vapor channel wall with an opening at the bottom fixed in the inner side of the inner wall, a pressure vessel disposed in the vapor channel wall, a vapor rising channel formed between the pressure vessel and the vapor channel wall, and it further comprises an outer wall surrounding the inner wall, a core molten material retention apparatus fixed at the bottom of the inner wall, and a deflector keeping away from the inner wall and the core molten material retention apparatus to form a gap; wherein a coolant falling channel is formed between the outer wall and the deflector, a coolant inlet is disposed at the bottom of the deflector, and a coolant channel is disposed between the inner wall and the core molten material retention apparatus; a core molten material retention recess is disposed at the upper surface of the core molten material retention apparatus, and the lower surface of the core molten material retention apparatus is arch-shaped; the core molten material retention apparatus is made of non-metal inorganic fireproof material. The invention adopts the design of molten material retention outside the reactor, using different material containing molten material and cooling the molten material by coolant cycle and the deflector structure, thus to improve the safety of the nuclear power plant.

10 Claims, 1 Drawing Sheet

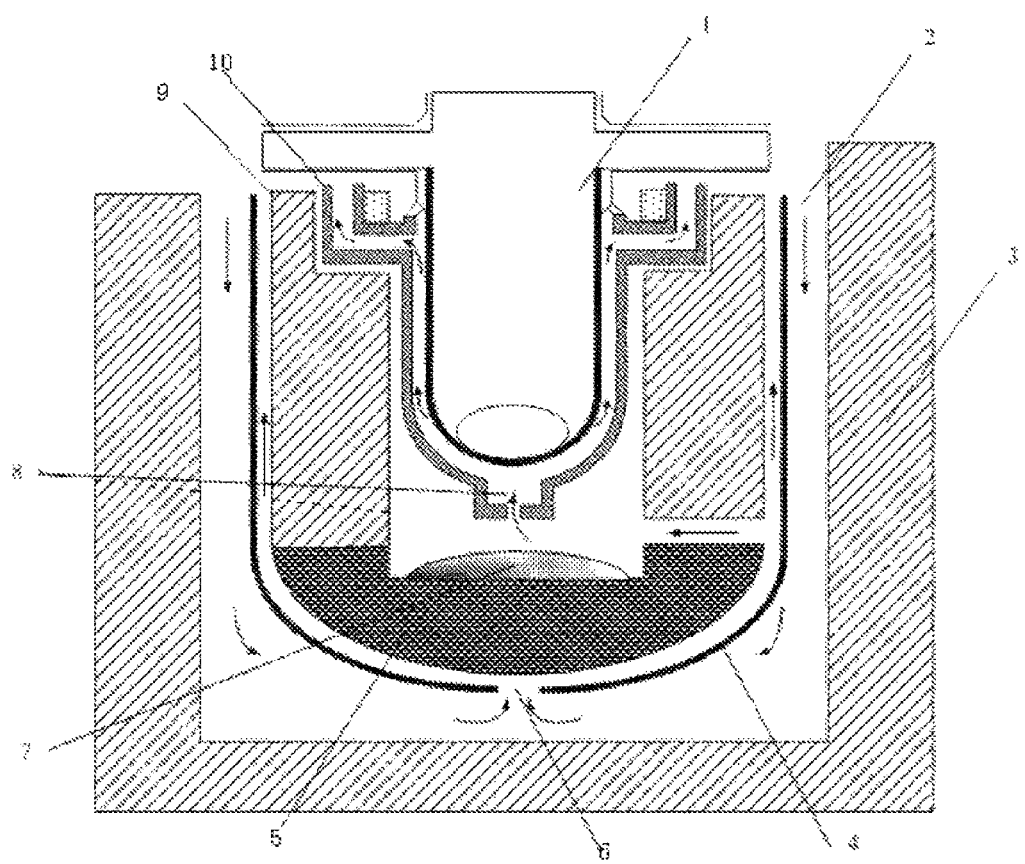

APPARATUS FOR RETENTION OF MOLTEN MATERIAL OUTSIDE GENERATION IV REACTOR AFTER NUCLEAR POWER PLANT ACCIDENT

PRIORITY CLAIM TO RELATED APPLICATIONS

This application is a U.S. National Stage application filed under 35 U.S.C. §371 from international application PCT/CN2012/077185, the international application filed Jun. 20, 2012, and published as WO 2013/159439 on Oct. 31, 2013, which claims priority to Chinese Application No. 201210127012.1, filed Apr. 27, 2012, which applications and publication are incorporated by reference as if reproduced herein and made a part hereof in their entirety, and the benefit of priority of each of which is claimed herein.

FIELD OF THE INVENTION

The invention relates to an apparatus for retention of molten material outside a Generation IV reactor after a nuclear power plant accident and, more particularly, to an apparatus for retention of molten material outside a Generation IV reactor after a nuclear power plant accident which adopts a completely passive cooling design for the core to improve the security of the nuclear power plant.

DESCRIPTION OF THE PRIOR ART

The molten material retention technology is one important relief measure for serious accidents in the nuclear power field, which can effectively cope with the radioactive release and maintain the integrity of the security boundary. At present, the Generation IV nuclear power adopts relief measures for serious accidents after the breakage of the pressure vessel.

AP-1000 adopts passive precaution and relief measure for serious accidents, which mainly includes providing molten core in-vessel retention (IVR) arrangement. When a core melting accident occurs, a reactor cavity flooding system injects the water into the core as well as the space between the outer wall of the pressure vessel and the insulating layer of the reactor pit to cool the core molten material falling from the core onto the bottom head of the pressure vessel, thus to ensure the bottom head not be molten through and the core molten material be kept in the reactor pressure vessel, so as to avoid the exothermic reaction provoked by the core molten material and the concrete bottom plate of the containment, thereby preventing the breakage of the bottom plate of the containment due to the direct heating and the vapor explosion. Noticeably, once the core molten material melts through the pressure vessel, the IVR can do nothing about it. Therefore, a new apparatus for retention of molten material for a Generation IV reactor after a nuclear power plant accident is urgently needed.

SUMMARY OF THE INVENTION

The technical problem solved by the invention is to provide an apparatus for retention of molten material outside a Generation IV reactor after a nuclear power plant accident.

To solve the technical problem, the invention provides an apparatus for retention of molten material outside a Generation IV reactor after a nuclear power plant accident, comprising an inner wall which is peripherally closed, a vapor channel wall with an opening at the bottom fixed at the inner side of the inner wall, a pressure vessel disposed in the vapor channel wall, a vapor rising channel formed between the pressure vessel and the vapor channel wall, and further comprising an outer wall which is peripherally closed and located above a bottom plate and which surrounds the inner wall, a core molten material retention apparatus fixed at the bottom of the inner wall, and a deflector located between the inner wall and the outer wall and kept away from the inner wall and the core molten material retention apparatus to form a gap; wherein a coolant falling channel is formed between the outer wall and the deflector, a coolant inlet is disposed at the bottom of the deflector, and a coolant channel is disposed between the inner wall and the core molten material retention apparatus; a core molten material retention recess is disposed at the upper surface of the core molten material retention apparatus and under the pressure vessel, and the lower surface of the core molten material retention apparatus is arch-shaped; the core molten material retention apparatus is made of non-metal inorganic fireproof material.

The non-metallic inorganic fireproof material is acid fireproof material, neutral fireproof material, alkaline fireproof material or high-temperature composite material.

The acid fireproof material is silicon oxide.

The neutral fireproof material is aluminum oxide, chromium oxide or graphite.

The alkaline fireproof material is magnesium oxide, calcium oxide, lanthanum oxide, beryllium oxide or zirconium oxide.

The high-temperature composite material is cermet or fiber reinforced ceramics.

The diameter of the core molten material retention recess is in the range of 4 m to 8 m, the depth is in the range of 1.8 m to 4 m, and the thickness between the bottom of the core molten material retention recess and the bottom of the core molten material retention apparatus is in the range of 0.5 m to 2 m.

The arch height of the lower surface of the core molten retention apparatus is in the range of 0.1 m to 2 m.

The gap between the deflector and the inner wall, core molten material retention apparatus is in the range of 0.1 m to 2 m.

The area of the coolant inlet of the deflector is in the range of $0.1 \, m^2$ to $1 \, m^2$.

When a serious accident occurs, after the core melts, the retention mechanism of the molten material in the reactor is too complex to recognize completely, so the possibility that the pressure vessel might be broken exists. When the pressure vessel is broken, the molten material flows out to react with the concrete of the bottom of the original cavity, producing a large amount of non-condensable gas, which may cause the containment to be under overpressure. Meanwhile, since the molten material generates decay heats therein, if the molten material is not sufficiently cooled, the molten material would melt through continuously and would eventually heat the containment directly and melt through the last safety barrier, leading to a large amount of radioactivity leak. The invention adopts design of molten material retention outside the reactor, using material different from the material of the pressure vessel to contain molten material and cooling the molten material by coolant cycle and the deflector structure, thus to ensure the decay heats of the molten material are conducted out in time for prevention of the reaction between the molten material and the concrete and the direct heating for the containment, keeping the safety barrier complete for prevention of a large amount of radioactivity leak, so as to greatly improve the safety of the nuclear power plant.

BRIEF DESCRIPTION OF THE DRAWINGS

FIG. 1 is a structural schematic diagram showing a apparatus for retention of molten material for a Generation IV reactor after a nuclear power plant accident provided by the invention.

In this figure: 1 indicates pressure vessel, 2 indicates coolant falling channel, 3 indicates outer wall, 4 indicates deflector, 5 indicates core molten material retention apparatus, 6 indicates coolant inlet, 7 indicates core molten material, 8 indicates vapor rising channel, 9 indicates inner wall, and 10 indicates vapor channel wall.

DETAILED DESCRIPTION OF THE PREFERRED EMBODIMENTS

The invention is further described in detail with the appended drawings and embodiment.

The invention includes a pressure vessel 1, an outer wall 3, an inner wall 9, a core molten material retention apparatus 5 and a deflector 4.

The inner wall 9 is peripherally closed and opened at the top and bottom, and a vapor channel wall 10 with an opening at the bottom is fixed in the inner side of the inner wall 9 by concrete placing. A pressure vessel 1 is disposed in the vapor channel wall 10 via pipes. A vapor rising channel 8 is formed between the pressure vessel 1 and the vapor channel wall 10.

The core molten material retention apparatus 5 is fixed at the bottom of the inner wall 9 by concrete placing. A coolant channel is disposed between the inner wall 9 and the core molten material retention apparatus 5. The core molten material retention apparatus 5 is composed of non-metallic inorganic fireproof material which can bear an upper limit temperature not less than 1580 degrees centigrade and which has good thermal-shock resistance ability and chemical corrosion resistance ability as well as low coefficients of heat conductivity and expansion. The non-metallic inorganic fireproof material has a plurality of fine channels which may lead the coolant vapor to the vapor rising channel 8. The non-metallic inorganic fireproof material may be acid fireproof material, neutral fireproof material, alkaline fireproof material or high-temperature composite material. The acid fireproof material is preferably silicon oxide. The neutral fireproof material is preferably aluminum oxide, chromium oxide or graphite. The alkaline fireproof material is preferably magnesium oxide, calcium oxide, lanthanum oxide, beryllium oxide or zirconium oxide. The high-temperature composite material is preferably cermet or fiber reinforced ceramic.

A core molten material retention recess is formed on the upper surface of the core molten material retention apparatus 5 and under the pressure vessel. The diameter of the core molten material retention recess is in the range of 4 m to 8 m to provide sufficient core capturing area, and the depth thereof is larger than 1.8 m to 4 m to bear the core molten material. The lower surface of the core molten retention apparatus 5 is arch-shaped, and the height of the arch is in the range of 0.1 m to 2 m. The thickness between the bottom of the core molten material retention recess and the bottom of the core molten material retention apparatus 5 is in the range of 0.5 m to 2 m.

The deflector 4 is fixedly connected to the outer surface of the inner wall via several (10 to 100) metal connectors, metal bolts or other elements, as long as the connection is steady. The deflector 4 is used to enhance the natural cycle, and since the deflector 4 only serves as a separator, it may be made of usual insulating material such as metal heat-insulating plate, with no special requirement for the thickness thereof, as along as the needed strength is obtained. The coolant inlet of the deflector adopts a circular structure. There is no very strict requirement for the area thereof, and the area of 0.1 m² to 1 m² is big enough to meet the requirement for heat convection. The gaps between the deflector 4 and the inner wall and between the deflector 4 and the core molten material retention apparatus are in the range of 0.1 m to 2 m.

The whole outer wall 3 is peripherally closed and is fixed on the bottom plate via concrete. The inner wall 9 and the core molten material retention apparatus 5 are wholly disposed in the outer wall 3. The fixation between the inner wall 9 and the outer wall 3 is achieved by several fixing points. The coolant falling channel 2 is formed between the inner wall 9 and the outer wall 3.

For the nuclear power plant, when a serious accident occurs, the pressure vessel 1 is broken, and the core melts core molten material 7. When the core molten material 7 flows out, the molten material retention apparatus 6 outside the reactor retains the core molten material 7. However, the core molten material will continuously generate decay heat. If the heat is not conducted out in time, the heat generated and accumulated by the core molten material 7 would melt through the bottom plate. The coolant falls from the coolant falling channel 2 and enters into the coolant inlet 6 on the deflector 4, and then enters into the coolant channel to cool the upper part of the core molten material 7. After the coolant evaporates, some of them pass through the molten material retention apparatus 5 outside the reactor and enters into the containment along the vapor rising channel, and the other enters into the containment via the gap between the deflector 4 and the inner wall 9. After the water vapor is cooled in the containment, it becomes coolant water and enters the containment via the coolant falling channel 2 to form a cycle.

The invention claimed is:

1. An apparatus for retention of molten material outside a Generation IV reactor after a nuclear power plant accident, said apparatus comprising:
   an inner wall which is peripherally closed,
   a vapor channel wall with an opening at a bottom fixed at an inner side of the inner wall,
   a pressure vessel disposed in the vapor channel wall, and
   a vapor rising channel formed between the pressure vessel and the vapor channel wall,
   wherein the apparatus further comprises an outer wall which is peripherally closed and located above a bottom plate and which surrounds the inner wall, a core molten material retention apparatus fixed at a bottom of the inner wall, and a deflector located between the inner wall and the outer wall and kept away from the inner wall and the core molten material retention apparatus to form gaps;
   wherein a coolant falling channel is formed between the outer wall and the deflector, a coolant inlet is disposed at a bottom of the deflector, and a coolant channel is disposed between the inner wall and the core molten material retention apparatus; a core molten material retention recess is disposed at an upper surface of the core molten material retention apparatus and under the pressure vessel, and a lower surface of the core molten material retention apparatus is arch-shaped; the core molten material retention apparatus is made of non-metal inorganic fireproof material.

2. The apparatus for retention of molten material outside a Generation IV reactor after a nuclear power plant accident according to claim 1, wherein the non-metallic inorganic fireproof material is acid fireproof material, neutral fireproof material, alkaline fireproof material or high-temperature composite material.

3. The apparatus for retention of molten material outside a Generation IV reactor after a nuclear power plant accident according to claim 2, wherein the acid fireproof material is silicon oxide.

4. The apparatus for retention of molten material outside a Generation IV reactor after a nuclear power plant accident according to claim 2, wherein the neutral fireproof material is aluminum oxide, chromium oxide or graphite.

5. The apparatus for retention of molten material outside a Generation IV reactor after a nuclear power plant accident according to claim 2, wherein the alkaline fireproof material is magnesium oxide, calcium oxide, lanthanum oxide, beryllium oxide or zirconium oxide.

6. The apparatus for retention of molten material outside a Generation IV reactor after a nuclear power plant accident according to claim 2, wherein the high-temperature composite material is cermet or fiber reinforced ceramic.

7. The apparatus for retention of molten material outside a Generation IV reactor after a nuclear power plant accident according to claim 1, wherein a diameter of the core molten material retention recess is in range of 4 m to 8 m, a depth is in range of 1.8 m to 4 m, and a thickness between a bottom of the core molten material retention recess and a bottom of the core molten material retention apparatus is in range of 0.5 m to 2 m.

8. The apparatus for retention of molten material outside a Generation IV reactor after a nuclear power plant accident according to claim 1, wherein a arch height of the lower surface of the core molten retention apparatus is in range of 0.1 m to 2 m.

9. The apparatus for retention of molten material outside a Generation IV reactor after a nuclear power plant accident according to claim 1, wherein the gaps between the deflector and the inner wall and between the deflector and the core molten material retention apparatus are in range of 0.1 m to 2 m.

10. The apparatus for retention of molten material outside a Generation IV reactor after a nuclear power plant accident according to claim 1, wherein an area of the coolant inlet of the deflector is in range of 0.1 $m^2$ to 1 $m^2$.

* * * * *